United States Patent
Mucha et al.

(10) Patent No.: US 10,391,400 B1
(45) Date of Patent: *Aug. 27, 2019

(54) ELECTRONIC CONTROLLER WITH HAND RETAINER AND FINGER MOTION SENSING

(71) Applicant: VALVE CORPORATION, Bellevue, WA (US)

(72) Inventors: Jeffrey Walter Mucha, Sammamish, WA (US); Jeffrey George Leinbaugh, Kirkland, WA (US); Eric James Hope, Duvall, WA (US); Philip Bryan, Bellevue, WA (US); Scott Richard Britt, Kirkland, WA (US); Scott Nietfeld, Bellevue, WA (US); Claire Michelle Gottschalk, Bellevue, WA (US); Jeremy Slocum, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/679,521

(22) Filed: Aug. 17, 2017

Related U.S. Application Data

(63) Continuation-in-part of application No. 29/580,635, filed on Oct. 11, 2016, now Pat. No. Des. 806,173.
(Continued)

(51) Int. Cl.
*A63F 13/428* (2014.01)
*G06F 3/01* (2006.01)
(Continued)

(52) U.S. Cl.
CPC ............ *A63F 13/428* (2014.09); *A63F 13/24* (2014.09); *G06F 3/014* (2013.01); *A63F 2009/2407* (2013.01)

(58) Field of Classification Search
CPC ........ G06F 3/014; A63F 13/428; A63F 13/24; A63F 2009/2407
See application file for complete search history.

(56) References Cited

U.S. PATENT DOCUMENTS

| 5,184,120 A | 2/1993 | Schultz |
| 8,062,126 B2 | 11/2011 | Marks et al. |

(Continued)

OTHER PUBLICATIONS

Brown et al, "5 improvements we're excited to see from Valve's 'Knuckles' controllers", retrieved on Jan. 20, 2019 at <<https://www.vrheads.com/5-Improvements-were-exclted-see-valves-knuckles-controllers>>, VR Heads, Jul. 11, 2017.

(Continued)

*Primary Examiner* — Jasson H Yoo
(74) *Attorney, Agent, or Firm* — Lee & Hayes, P.C.

(57) ABSTRACT

A controller for an electronic system includes a controller body having a handle portion, a tracking arc that is fixed to the controller body, and a hand retainer configured to physically bias a user's palm against an outside surface of the handle portion. A plurality of tracking sensors is disposed in the tracking arc, and are responsive to electromagnetic radiation emitted by the electronic system. An array of proximity sensors are spatially distributed around the outer surface of the handle portion, and are responsive to a proximity of the user's fingers to the outside surface of the handle portion.

27 Claims, 5 Drawing Sheets

Related U.S. Application Data

(60) Provisional application No. 62/520,958, filed on Jun. 16, 2017.

(51) Int. Cl.
*A63F 13/24* (2014.01)
*A63F 9/24* (2006.01)

(56) References Cited

U.S. PATENT DOCUMENTS

| | | | |
|---|---|---|---|
| 8,636,199 B1* | 1/2014 | Slayden | G10H 1/0091 |
| | | | 235/375 |
| 8,816,964 B2 | 8/2014 | Edwards | |
| 9,690,408 B1 | 6/2017 | Krah | |
| 10,353,506 B2 | 7/2019 | Vosgueritchian et al. | |
| 2002/0010020 A1 | 1/2002 | Johnson | |
| 2002/0175894 A1* | 11/2002 | Grillo | G06F 3/014 |
| | | | 345/156 |
| 2004/0012557 A1* | 1/2004 | Daniel | A63F 13/06 |
| | | | 345/156 |
| 2005/0172734 A1 | 8/2005 | Alsio et al. | |
| 2005/0179644 A1 | 8/2005 | Alsio et al. | |
| 2006/0146018 A1 | 7/2006 | Arneson et al. | |
| 2006/0293864 A1 | 12/2006 | Soss | |
| 2008/0136778 A1* | 6/2008 | Hursh | G06F 3/014 |
| | | | 345/164 |
| 2008/0146336 A1 | 6/2008 | Feldman et al. | |
| 2008/0261693 A1 | 10/2008 | Zalewski | |
| 2008/0311990 A1 | 12/2008 | Chiu et al. | |
| 2009/0143141 A1 | 6/2009 | Wells et al. | |
| 2009/0305786 A1 | 12/2009 | Chang | |
| 2011/0059796 A1 | 3/2011 | Kondo et al. | |
| 2011/0084932 A1 | 4/2011 | Simmons et al. | |
| 2011/0159959 A1 | 6/2011 | Mallinson et al. | |
| 2012/0088580 A1 | 4/2012 | Takeda et al. | |
| 2012/0143091 A1 | 6/2012 | Annett et al. | |
| 2013/0027341 A1 | 1/2013 | Mastandrea | |
| 2014/0098018 A1* | 4/2014 | Kim | G06F 3/014 |
| | | | 345/156 |
| 2014/0313168 A1 | 10/2014 | Luo | |
| 2014/0366650 A1 | 12/2014 | Thillainadarajah et al. | |
| 2015/0084884 A1 | 3/2015 | Cherradi El Fadili | |
| 2016/0030835 A1 | 2/2016 | Argiro | |
| 2016/0085355 A1 | 3/2016 | Pirogov et al. | |
| 2016/0124500 A1* | 5/2016 | Lee | G06F 3/011 |
| | | | 345/156 |
| 2016/0259404 A1 | 9/2016 | Woods | |
| 2016/0306932 A1* | 10/2016 | Fateh | G06F 19/3456 |
| 2016/0317267 A1 | 11/2016 | Meerbeek et al. | |
| 2016/0342218 A1 | 11/2016 | Burba et al. | |
| 2016/0356658 A1 | 12/2016 | Hou et al. | |
| 2016/0357261 A1* | 12/2016 | Bristol | A63F 13/24 |
| 2016/0364910 A1 | 12/2016 | Higgins et al. | |
| 2017/0135586 A1 | 5/2017 | Jeon et al. | |
| 2017/0139481 A1* | 5/2017 | Long | G06F 3/014 |
| 2017/0205903 A1 | 7/2017 | Miller et al. | |
| 2018/0067545 A1 | 3/2018 | Provancher et al. | |
| 2018/0161670 A1 | 6/2018 | Boev | |
| 2019/0076716 A1 | 3/2019 | Chiou et al. | |

OTHER PUBLICATIONS

The PCT Search Report and Written Opinion dated Feb. 8, 2019 for PCT Application No. PCT/US2018/064120, 11 pages.

Non Final Office Action dated Jan. 8, 2019 for U.S. Appl. No. 15/834,425 "Electronic Controller with a Hand Retainer, outer shell, and finger sensing" Hope, 11 pages.

Non Final Office Action dated Jan. 18, 2019 for U.S. Appl. No. 15/834,425 "Electronic Controller with a Hand Retainer, outer shell, and finger sensing" Hope, 20 pages.

Notification of Transmittal of the International Search Report and the Written Opinion of the International Search Authority, or the Declaration (in English) of Int. App. No. PCT/US18/37952, filed on Jun. 15, 2018, dated Sep. 10, 2018 from ISA/US, 19 pages.

The PCT Search Report and Written Opinion dated Feb. 6, 2019 for PCT Application No. PCT/US2018/064116, 8 pages.

Freescale Semiconductor, Inc. "Touch Sensors", 2009, «https://www.freescale.com/touch», 2 pages.

Non Final Office Action dated Jul. 15, 2019 for U.S. Appl. No. 16/010,385 "Electronic Controller with Finger Motion Sensing" Nietfeld, 11 pages.

Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.

* cited by examiner

ELECTRONIC CONTROLLER WITH HAND RETAINER AND FINGER MOTION SENSING

CROSS-REFERENCE TO RELATED APPLICATIONS

This application claims priority under 35 U.S.C. § 119 to U.S. Provisional Patent Application No. 62/520,958 filed on 16 Jun. 2017, entitled "Electronic controller with hand retainer and finger motion sensing." This application also claims priority under 35 U.S.C. § 120 as a continuation-in part to pending U.S. Design Patent Application Serial No. 29/580,635 filed on 11 Oct. 2016, entitled "Controller," which is incorporated by reference herein.

BACKGROUND

The video game industry has become large and important, and has spawned many innovations in both software and related hardware. Various hand-held video game controllers have been designed, manufactured, and sold, for a variety of game applications. Some of those innovations have applicability outside of the video game industry, such as for controllers of industrial machines, defense systems, robotics, etc. Virtual reality (VR) systems are an application of great contemporary interest and rapid technical advancement, both within and outside of the video game industry. The controllers for VR systems have to perform several different functions, and meet strict (and sometimes competing) design constraints, often while optimizing certain desired characteristics like ease of use, etc. Hence, there is a need in the art for an improved controller design that may improve VR systems and/or better facilitate user operation.

DETAILED DESCRIPTION OF EXAMPLE EMBODIMENTS

Figure 1:
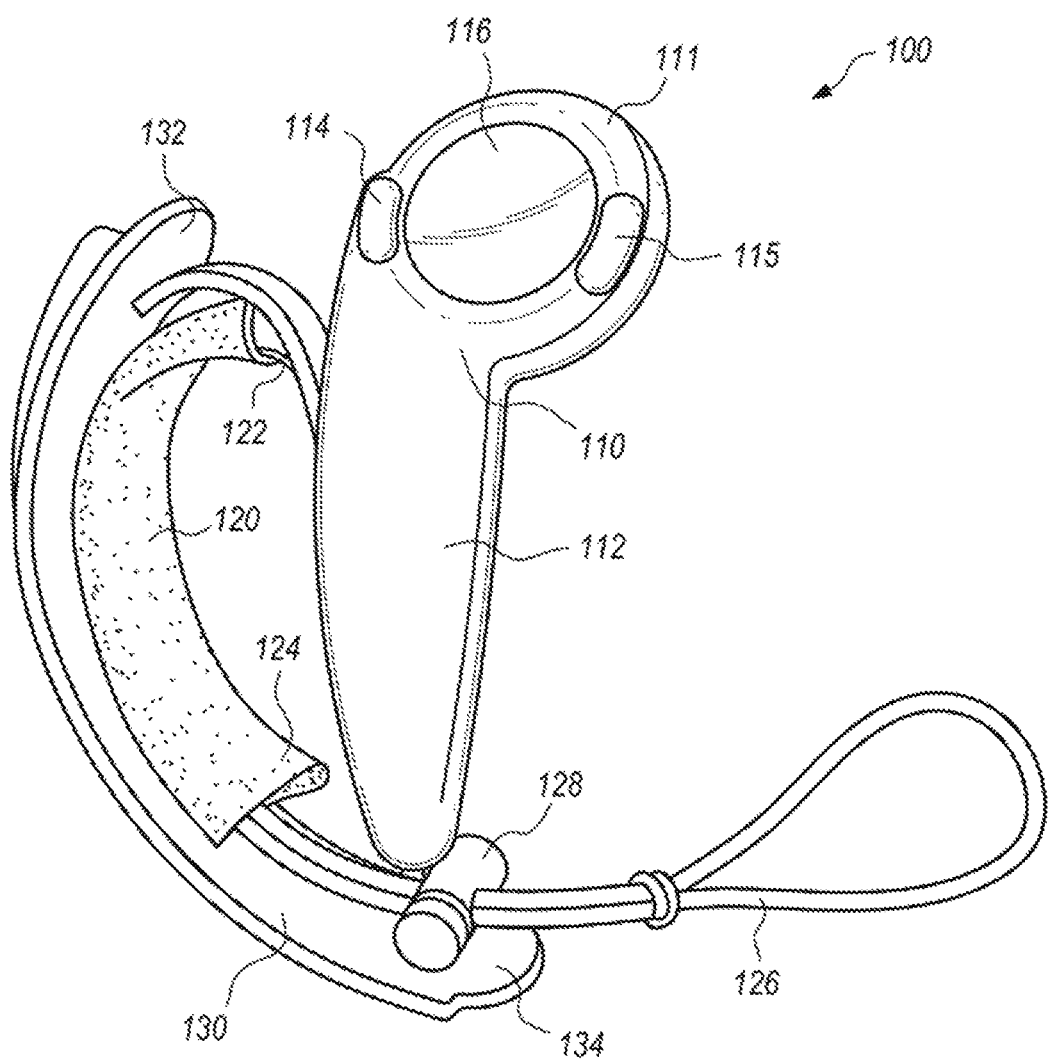
FIG. 1 depicts a controller according to an example embodiment of the present invention, with a hand retainer in an open position.

FIGS. 1-4 depict a controller 100 for an electronic system according to an example embodiment of the present invention. The controller 100 may be utilized by an electronic system such as a VR video gaming system, a robot, weapon, or medical device. The controller 100 may include a controller body 110 having a handle portion 112, and a hand retainer 120 to retain the controller 100 in the hand of a user (e.g. the user's left hand). The handle portion 112 may optionally be substantially cylindrical. In this context, a substantially cylindrical shape need not have constant diameter, or a perfectly circular cross-section.

In the embodiment of FIGS. 1-4, the controller body 110 may include a distal head (between the handle portion 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking arc 130 that is fixed to the controller body 110, and optionally includes two noses 132, 134, each protruding from a corresponding one of two opposing distal ends of the tracking arc 130. The tracking arc 130 preferably includes a plurality of tracking sensors disposed therein, with at least one tracking sensor disposed in each protruding nose 132, 134. Additional tracking sensors may be disposed also in the controller body 110, with preferably at least one distal tracking sensor disposed adjacent the distal end 111.

The foregoing tracking sensors are preferably responsive to electromagnetic radiation emitted by the electronic system. For example, the electronic system may be a VR gaming system that widely broadcasts, i.e. paints, pulsed infra-red radiation (i.e. IR light) towards the controller 100, with the plurality of tracking sensors of the tracking arc 130 being IR light sensors that may receive or be shadowed from the broadcast pulsed IR light. The tracking sensors in each nose 132, 134 (e.g. 3 sensors in each nose) preferably overhang the user's hand on each distal end of the tracking arc 130, and so are better exposed (around the user's hand) to the electromagnetic radiation emitted by the electronic system, at more angles without an unacceptable amount of shadowing.

In certain embodiments, each of the IR light sensors may be covered by a layer of IR-transmissive polycarbonate plastic, which may form a window to permit IR light to affect that sensor. For example, the tracking arc may be fabricated from a so-called "double shot" injection molding process, so that the majority of the tracking arc is fabricated from IR-opaque plastic, but with IR-transmissive plastic being disposed above the IR light sensors. Alternatively, the sensors may be disposed over the IR-opaque plastic but beneath an IR-transmissive plastic film (e.g. a thin laminated film). In certain embodiments, each of the IR light sensors may be recessed into the tracking arc 130, with the IR transmissive polycarbonate plastic forming a narrow window above it, so that each sensor receives IR light only from a preferred angular range (e.g. to avoid undesired internal IR reflections).

In other embodiments, the tracking arc 130 and the controller body 110 may be fabricated from an IR-transmissive plastic, with an outer IR-opaque coating to reduce undesired internal IR reflections. In such embodiments, the outer IR-opaque coating may include openings over the locations of the infrared (IR) light sensors to create windows above them. The response of the plurality of tracking sensors may be communicated back to the electronic system, and the system may interpret such response to effectively track the location and orientation of the controller 100.

Preferably, the tracking arc 130 and the controller body 110 are made of a substantially rigid material such as hard plastic, and are firmly fixed together so that they do not appreciably translate or rotate relative to each other. In this way, the tracking of the translation and rotation of the constellation of tracking sensors in space, is preferably not complicated by motion of the tracking sensors relative to each other. For example, as shown in FIGS. 1-4, the tracking arc 130 may be fixed to the controller body 110 by being joined to the controller body 110 at two locations. The hand retainer 120 may be attached to the controller 100 (either the controller body 110 or the tracking arc 130) adjacent those two locations, to bias the user's palm against the outside surface of the handle portion 112 between the two locations.

In certain embodiments, the tracking arc 130 and the controller body 110 may comprise an integral monolithic component having material continuity, rather than being assembled together. For example, the tracking arc 130 and the controller body 110 may be molded together by a single injection-molding process step, resulting in one integral hard plastic component that comprises both the tracking arc 130 and the controller body 110. Alternatively, the tracking arc 130 and the controller body 110 may be initially fabricated separately, and then later assembled together. Either way, the tracking arc 130 may be considered as fixed to the controller body 110.

The hand retainer 120 is shown in the open position in FIG. 1. The hand retainer 120 may optionally be biased in the open position by a curved resilient member 122, to facilitate the insertion of the user's left hand between the hand retainer 120 and the controller body 110 when the user is grasping for the controller with vision blocked by VR goggles. For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 128. In such embodiments, the tension that the curved resilient member 122 imparts to the hand retainer 120 (to bias it in the open position) causes the hand retainer to automatically open when the draw cord 128 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 2:
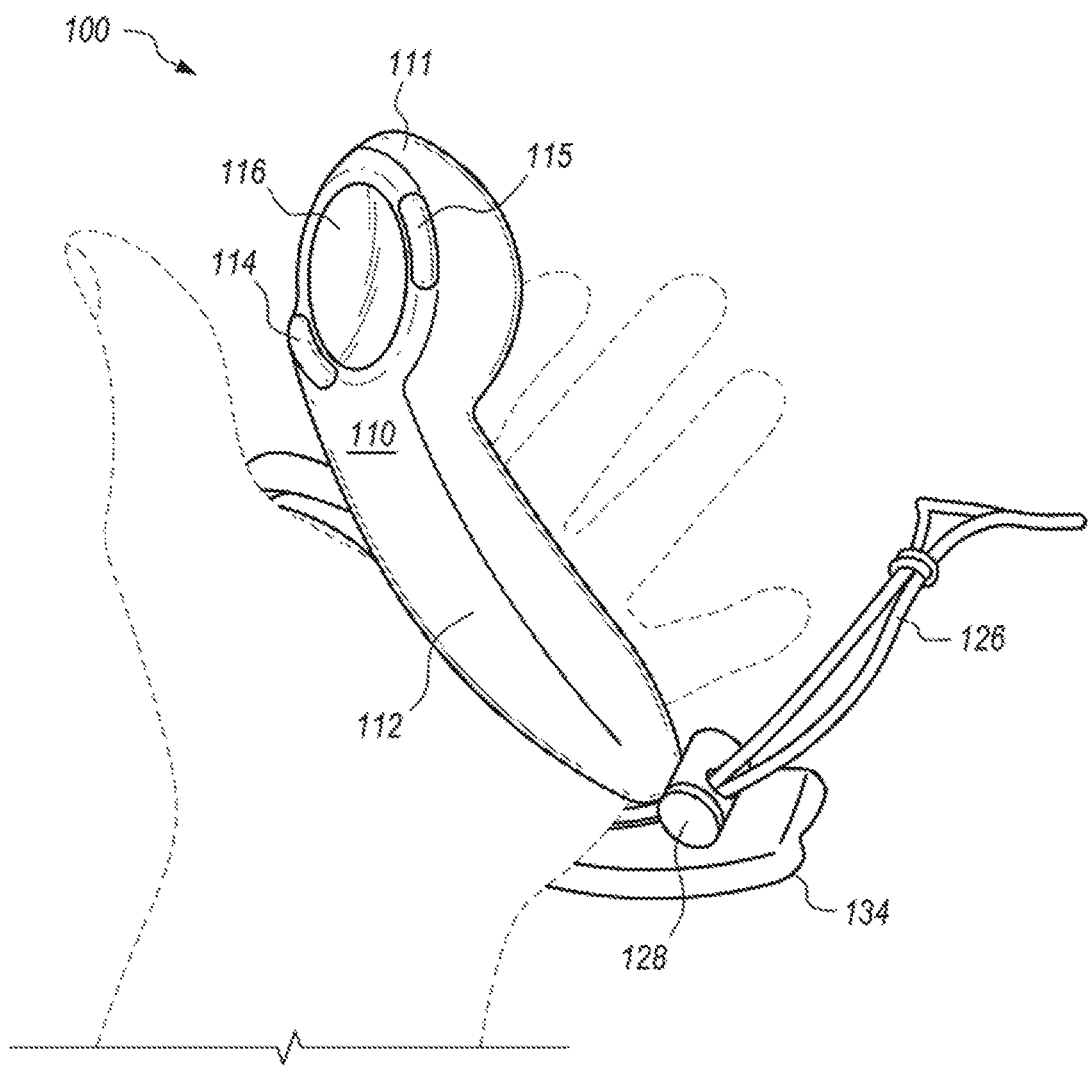
FIG. 2 depicts the controller of FIG. 1 in a user's open hand, palm up.
Figure 3:
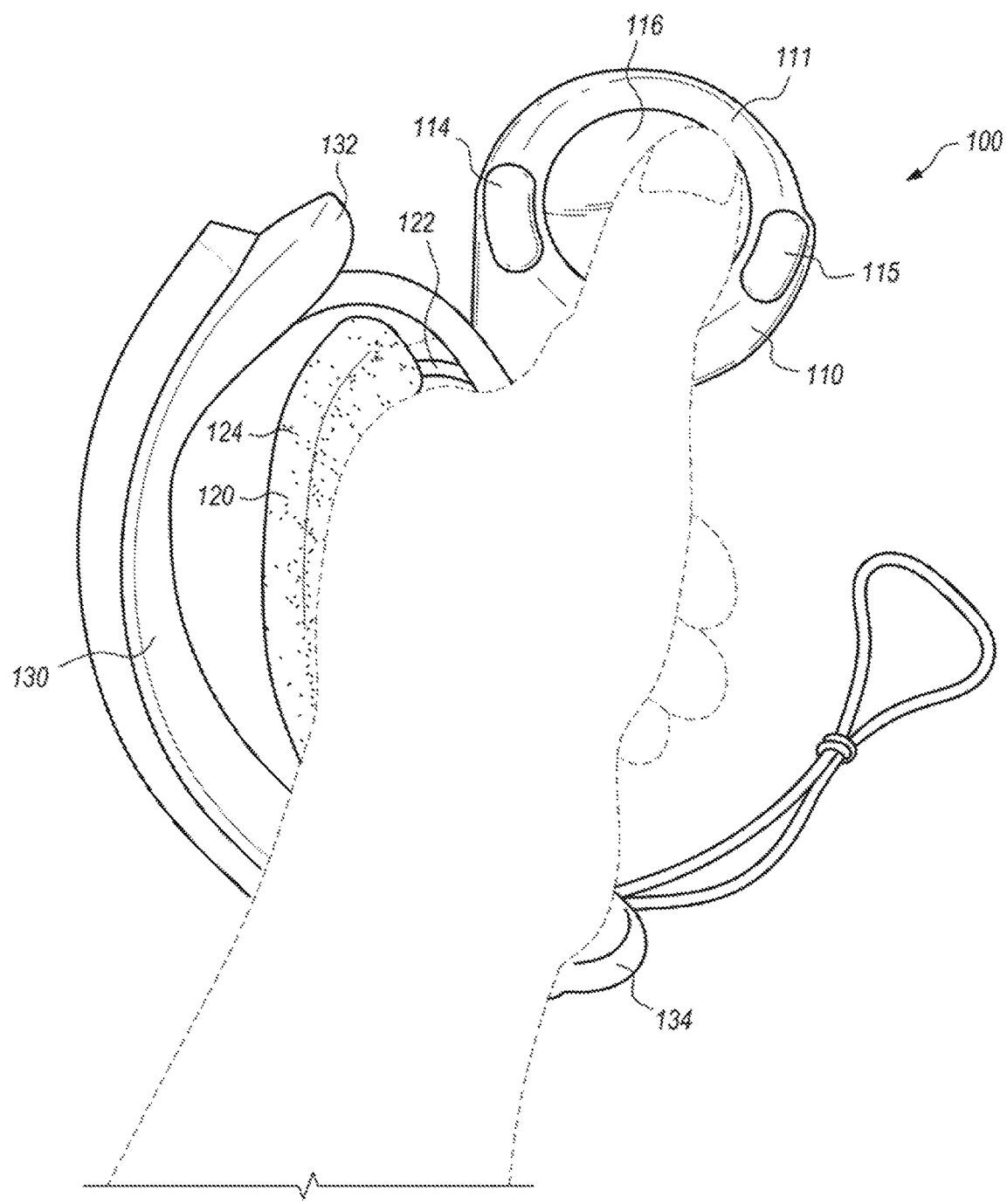
FIG. 3 depicts the controller of FIG. 1 in a user's closed hand.
Figure 4:
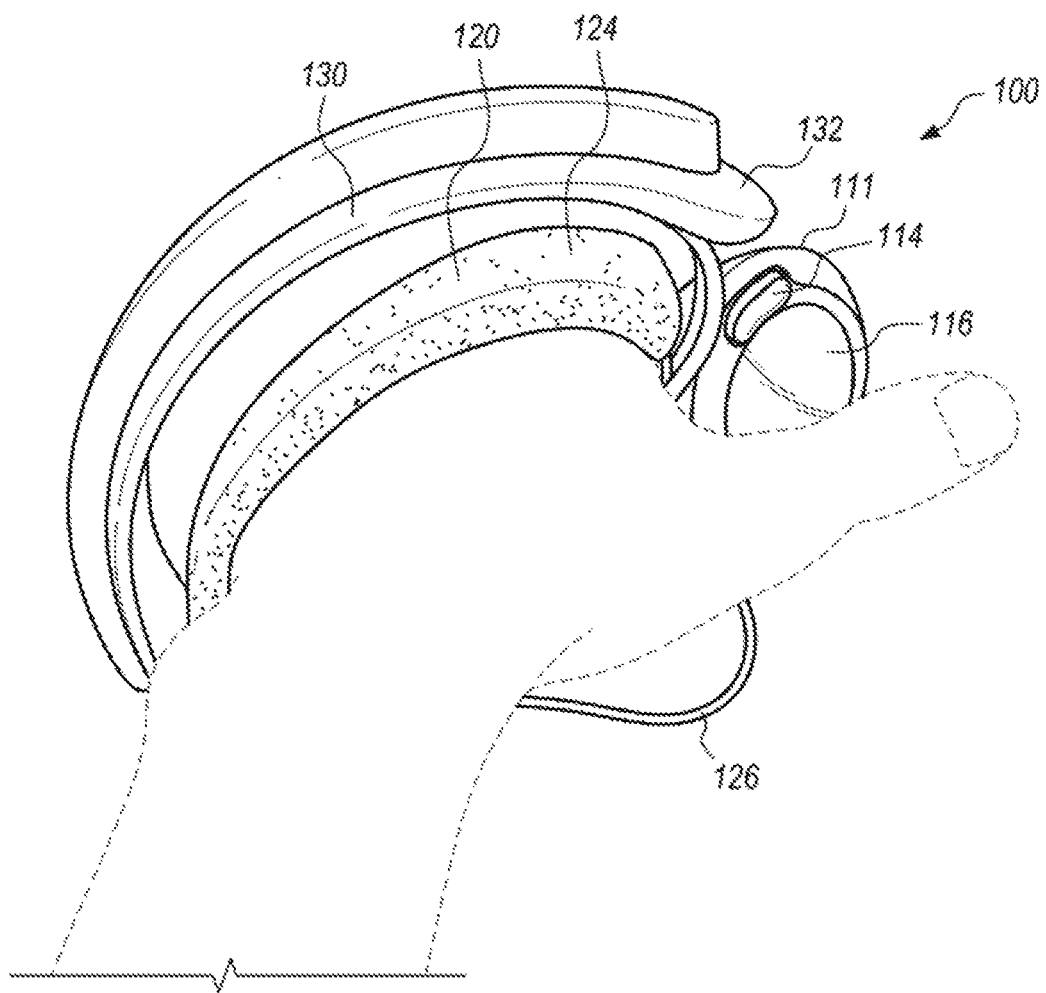
FIG. 4 depicts the controller of FIG. 1 in a user's hand, palm down.

The hand retainer 120 may be disposed between the handle portion 112 and the tracking arc 130, and be configured to contact a back of the user's hand. FIG. 2 shows the controller 100 during operation with the user's left hand inserted therein but not grasping the controller body 110. In FIG. 2, the hand retainer is closed and tightened over the hand, to physically bias the user's palm against the outside surface of the handle portion 112. In that way, the hand retainer, when closed, may retain the controller 100 to the hand even when the hand is not grasping the controller body 110. FIGS. 3 and 4 depict the controller 100 during operation when the hand retainer 120 is closed, and the hand is grasping the controller body 110 and the thumb is operating one or more of the thumb-operated controls (e.g. track pad 116).

The handle portion 112 of the controller body 110 preferably includes an array of proximity sensors that are spatially distributed partially or completely around its outer surface. The array of proximity sensors is preferably responsive to the proximity of the user's fingers to the outside surface of the handle portion 112. For example, the array of proximity sensors may be a plurality of capacitive sensors embedded under the outer surface of the handle portion 112, with that outer surface comprising an electrically insulative material. The capacitance between such an array of capacitive sensors and a portion of the user's hand is inversely related to the distance there between. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle portion 112.

When the hand retainer 120 (e.g. a hand-retention strap) is closed tightly, it may serve not only to prevent the controller 100 from falling out of hand, but also to keep fingers from excessively translating relative to the proximity sensor array of the handle portion 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking sensors, and may render the release of a thrown object based on the sensed release of the user's fingers from the outer surface of the handle portion of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle portion 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 1-4 may help the tracking arc 130 to protect back of user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle portion 112 of the controller body 110, and/or the tracking sensors in the tracking arc 130.

Figure 5:
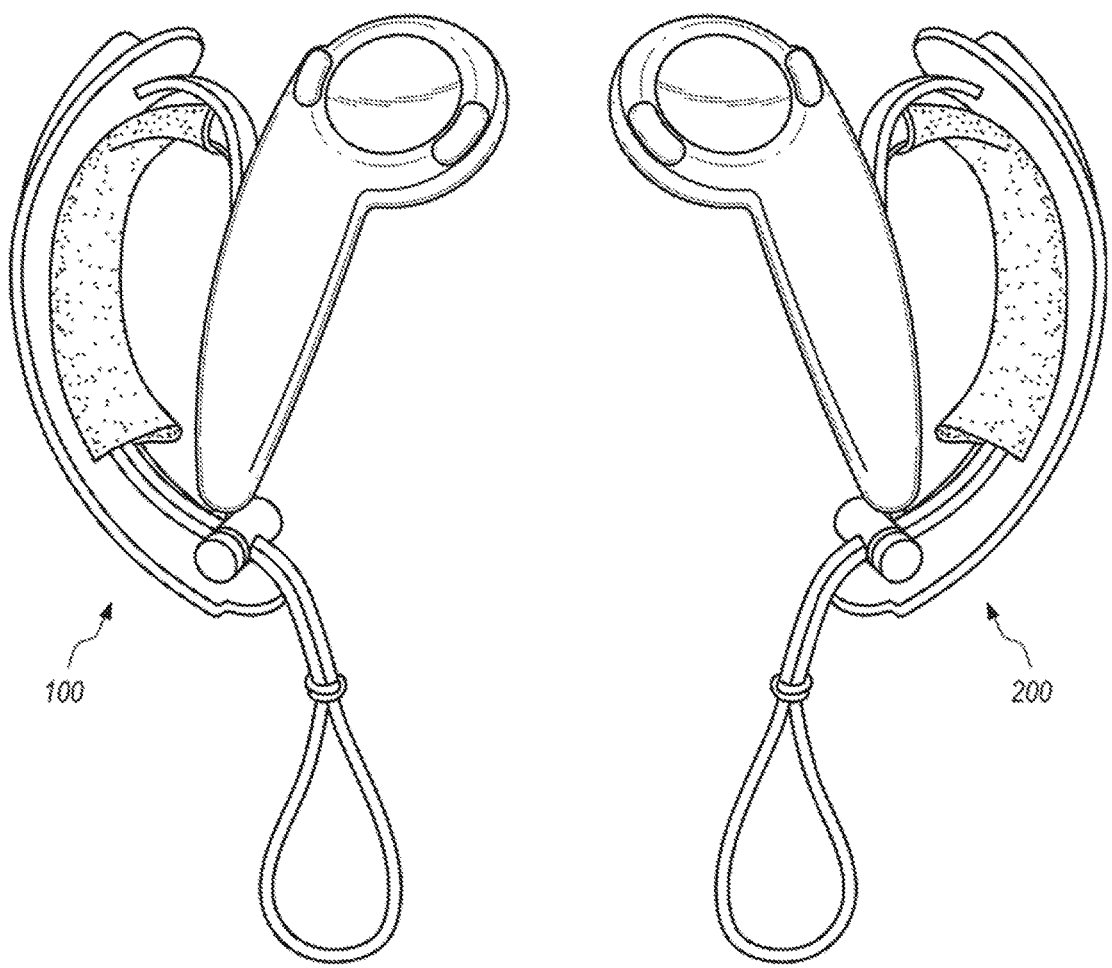
FIG. 5 depicts a pair of controllers according to an example embodiment of the present invention, with hand retainers in an open position.

As shown in FIG. 5, in certain embodiments the controller 100 may be the left controller in a pair of controllers that includes a similar right controller 200. In certain embodiments, the controllers 100 and 200 may (together) track the motion and grip of both of a user's hands, simultaneously, for example to enhance a VR experience.

The invention is described with reference to specific exemplary embodiments herein, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A controller for an electronic system, for operation by a user having a hand with fingers and a palm, the controller comprising:
a controller body having a handle portion with an outside surface;
a tracking arc that is fixed to the controller body;
a hand retainer configured to physically bias the palm against the outside surface;
a first plurality of tracking sensors disposed in the tracking arc, the first plurality of tracking sensors being responsive to electromagnetic radiation emitted by the electronic system; and
an array of proximity sensors that are spatially distributed around the outside surface of the handle portion, the array of proximity sensors being responsive to a proximity of the fingers to the outside surface of the handle portion.

2. The controller of claim 1, wherein the electronic system is a virtual reality system.

3. The controller of claim 1, wherein the tracking arc is fixed to the controller body by being joined to the controller body at two locations, and the hand retainer biases the palm against the outside surface of the handle portion between the two locations.

4. The controller of claim 3, wherein the hand retainer comprises a hand-retention strap.

5. The controller of claim 4, wherein the hand-retention strap is attached to the controller body adjacent the two locations.

6. The controller of claim 5, wherein the hand-retention strap is disposed between the handle portion and the tracking arc.

7. The controller of claim 4, wherein the hand-retention strap is adjustable in length and is configured to contact a back of the hand.

8. The controller of claim 7, wherein the hand-retention strap includes a cord that is cinched by a spring-biased chock.

9. The controller of claim 4, wherein at least a portion of the hand-retention strap includes a cushioning sheath enveloping an internal curved resilient member.

10. The controller of claim 4, wherein the controller includes a rechargeable battery disposed within the controller body, and the hand retention strap includes an electrically-conductive charging wire that is electrically coupled to the rechargeable battery.

11. The controller of claim 1, wherein the controller body further comprises a distal head that extends from the handle portion, the distal head including a distal end, and at least one thumb-operated control disposed between the handle portion and the distal end.

12. The controller of claim 11, further comprising a radio frequency (RF) transmitter that is responsive to the thumb-operated control.

13. The controller of claim 11, further comprising a second plurality of tracking sensors disposed in the controller body, the second plurality of tracking sensors including at least one distal tracking sensor that is disposed adjacent the distal end.

14. The controller of claim 1, wherein the first plurality of tracking sensors are infrared (IR) light sensors that are responsive to pulsed IR light emitted by the electronic system.

15. The controller of claim 14, wherein each of the IR light sensors is covered by IR-transmissive polycarbonate plastic.

16. The controller of claim 14, wherein the tracking arc and the controller body comprise an IR-transmissive plastic, with an outer IR-opaque coating, the outer IR-opaque coating including openings over locations of the IR light sensors.

17. The controller of claim 1, wherein the tracking arc includes two noses, each protruding from a corresponding one of two opposing distal ends of the tracking arc, each nose including at least one of the first plurality of tracking sensors.

18. The controller of claim 1, wherein the array of proximity sensors is a plurality of capacitive sensors embedded under the outside surface of the handle portion, the outside surface comprising an electrically insulative material.

19. The controller of claim 1, wherein the tracking arc and the controller body comprise an integral monolithic component having material continuity, rather than being assembled together.

20. The controller of claim 1, wherein the hand retainer includes a curved resilient member.

21. The controller of claim 20, wherein the curved resilient member is a metal strip.

22. A controller for an electronic system, for operation by a user having a hand with fingers, the controller comprising:
a controller body having a handle portion with an outside surface;
a tracking arc that is fixed to the controller body;
a hand retainer including a resilient member that biases the hand retainer in an open position;
a first plurality of tracking sensors disposed in the tracking arc, the first plurality of tracking sensors being responsive to electromagnetic radiation emitted by the electronic system; and
an array of proximity sensors that are spatially distributed around the outside surface of the handle portion, the array of proximity sensors being responsive to a proximity of the fingers to the outside surface of the handle portion.

23. The controller of claim 22, wherein the hand includes a palm, and wherein the hand retainer comprises a hand-retention strap that is adjustable in length, the hand retainer, when the hand-retention strap is adjusted in length, configured to physically bias the palm against the outside surface.

24. The controller of claim 23, wherein the hand-retention strap includes a cord that is cinched by a spring-biased chock.

25. A controller for an electronic system, for operation by a user having a hand with fingers and a palm, the controller comprising:
a controller body having a handle portion with an outside surface;
a tracking arc that is coupled to the controller body;

a hand retainer including a hand-retention strap that is adjustable in length, the hand retainer, when the hand-retention strap is adjusted in length, configured to physically bias the palm against the outside surface;

a first plurality of tracking sensors disposed in the tracking arc, the first plurality of tracking sensors being responsive to electromagnetic radiation emitted by the electronic system; and an array of proximity sensors that are spatially distributed on the outside surface of the handle portion, the array of proximity sensors being responsive to a proximity of the fingers to the outside surface of the handle portion.

26. The controller of claim 25, wherein the hand-retention strap includes a cord that is cinched by a spring-biased chock.

27. The controller of claim 25, wherein the hand retainer further includes a resilient member that biases the hand retainer in an open position.

\* \* \* \* \*